United States Patent [19]
Csontos

[11] 3,826,566
[45] July 30, 1974

[54] APPARATUS FOR THE SYNCHRONIZATION OF SEPARATE PICTURE AND SOUND RECORDS
[75] Inventor: Michael W. Csontos, North Chili, N.Y.
[73] Assignee: Eastman Kodak Company, Rochester, N.Y.
[22] Filed: Apr. 23, 1970
[21] Appl. No.: 31,182

[52] U.S. Cl............ 352/12, 352/23, 352/24, 352/31, 352/92, 352/236
[51] Int. Cl............................................ G03b 31/04
[58] Field of Search............ 352/12, 23, 24, 31, 17, 352/15, 92, 236

[56] References Cited
UNITED STATES PATENTS
| | | | |
|---|---|---|---|
| 2,679,187 | 5/1954 | Bitting | 352/12 |
| 2,892,900 | 6/1959 | Guttwien | 352/17 |
| 2,905,048 | 9/1959 | Miller | 352/92 X |
| 3,449,046 | 6/1969 | White | 352/92 X |
| 3,515,470 | 6/1970 | Browder | 352/236 X |
| 3,539,248 | 11/1970 | Lancor | 352/19 X |

FOREIGN PATENTS OR APPLICATIONS
| | | | |
|---|---|---|---|
| 617,141 | 3/1961 | Canada | 352/17 |
| 1,434,273 | 2/1966 | France | 352/12 |

Primary Examiner—Louis R. Prince
Assistant Examiner—Frederick Shoon
Attorney, Agent, or Firm—Mr. M. S. Sales

[57] ABSTRACT

Apparatus usable with an ordinary magnetic tape recorder for preparing sound motion pictures includes a camera adapted to code mark film and to produce a sync pulse signal for magnetically marking the sound record. An accessory box couples the camera and recorder for activating the camera film coding mechanism in response to receipt from the camera of the first and last sync pulse signal of a sound scene and for converting the sync pulse signal into frame rate and scene identification signals, which, after being mixed with the scene sound signal, are applied to a sound track of the tape recorder.

9 Claims, 5 Drawing Figures

PATENTED JUL 30 1974 3,826,566
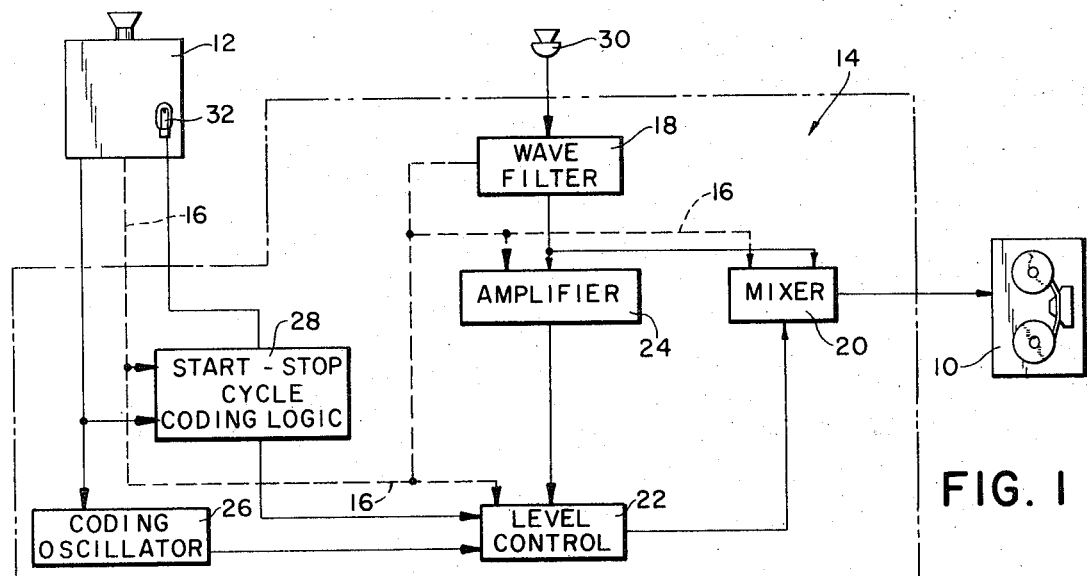
FIG. 1
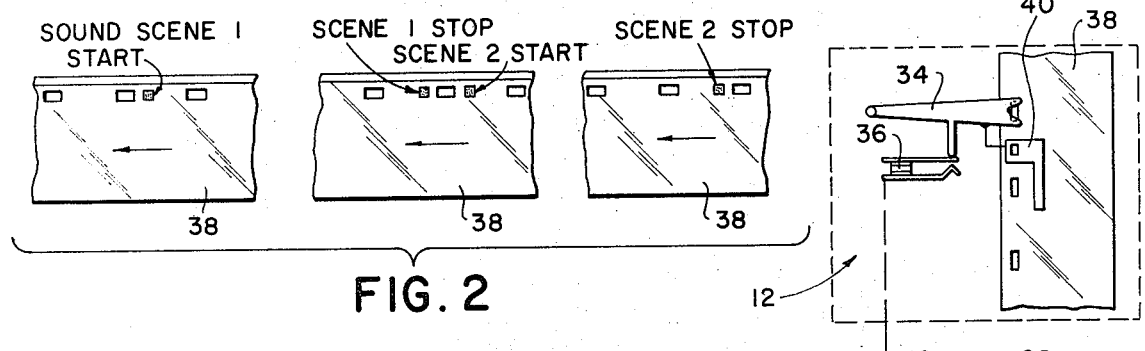
FIG. 2
FIG. 3
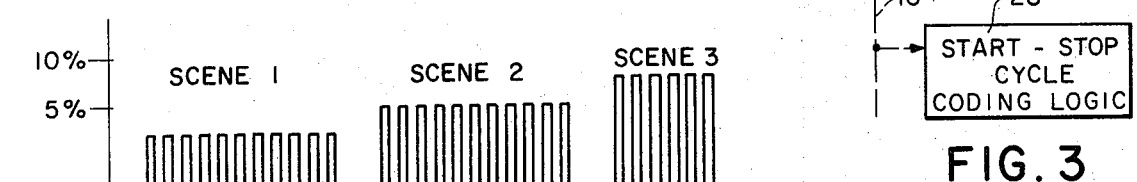
FIG. 4
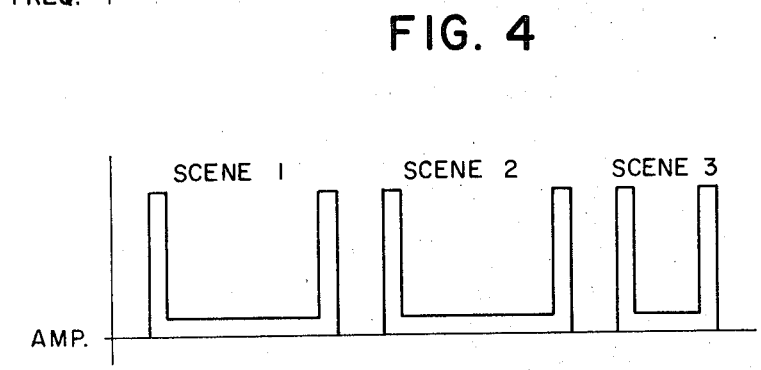
FIG. 5
MICHAEL W. CSONTOS
INVENTOR.
BY Milton S. Sales
Robert W. Hampton
ATTORNEYS

APPARATUS FOR THE SYNCHRONIZATION OF SEPARATE PICTURE AND SOUND RECORDS

BACKGROUND OF THE INVENTION

1. Field of the Invention

The present invention relates to motion picture photography, and particularly to the synchronization of a separate sound recording with its associated film image.

2. Description of the Prior Art

There are now several products in commercial use for producing sound accompanied motion picture films for public reproduction. For example, in accordance with one widely used method, the sound is optically recorded on the film by light patterns as the scene is photographed. As the film is processed, both the sound track and the image track are developed simultaneously so that proper synchronization is attained. Such systems have to now been considered too complicated and expensive for amateur use.

With the advent of Super 8 film, home movies are becoming increasingly popular. However, home sound motion pictures have not met with the same popularity as silent movies even though there have been many different proposals in the past for camera and/or recorders designed to produce such films.

Two such proposals are disclosed in United States Pat. No. 2,679,187 to R. C. Bitting, Jr. and U.S. Pat. No. 3,266,862 to R. G. Wagoner. The Bitting apparatus includes a camera vibration pickup which produces a signal indicative of camera speed. That signal is combined with a scene sound signal and recorded on magnetic tape. During replay, the sound and speed signals are separated and the latter is used to regulate the speed of a projector. While the Bitting apparatus is suitable for its intended purpose, it does not provide positive identification of picture and sound records to insure against possible mismatching of pictures and sound scenes. The Bitting apparatus is designed solely to keep a projector in synchronization with a recorder once initial synchronization has been established.

The apparatus described in the Wagoner patent is somewhat similar to that of Bitting except that Wagoner provides a timing signal source for establishing initial synchronization, a reference signal then being used to maintain such synchronization. Hence, there is no provision for identifying one sound scene from another. Further, there is no provision for positively marking the picture record with sound recording information so that it may later be compared to the recording to indicate which picture scenes are accompanied by sound and which are not.

One commercially available system accomplishes synchronization of a recorder and projector in response to a "start" mark on the film, and to "synchronization" and "stop" signals recorded on the tape. The camera flashes the "start" mark on the film at the beginning of every sound sequence and provides one electrical sync pulse for each frame advanced during a sound sequence. These sync pulse and a "stop" signals are recorded on a separate control track on the tape to be later used during playback for keeping the recorder and a projector in synchronization. During the picture taking sequence, a sync signal switch in the camera opens and closes in response to a cam on the shutter shaft to provide a pulse for each frame advanced during a sound sequence. The sync signal from the camera is transmitted to the recorder to perform three functions. First, the sync signal is fed through a pulse integrating circuit that sends a delayed "start" signal to a motor power control switch that turns on the tape recorder transport motor. Secondly, the sync signal is sent through a shaper to a transducer head that records it on the control track of the tape. Thirdly, the sync signal is sent to a pulse detecting circuit that places a "start" mark on the film. When the camera is turned off, the pulse detector circuit senses the loss of sync signals and allows a "stop" signal to be recorded on the control track of the tape. The disadvantage of this system is that it requires the purchase of a specially adapted and relatively expensive tape recorder. The tape recorder must have at least two sound tracks, one for synchronization purposes and one to record the scene program. The tape recorder is necessarily complicated in that it must contain circuitry necessary to provide synchronization between the picture and sound records during both record and reproduction operations. For many people who now own personal tape recorders not so equipped, the purchase of a second recorder which duplicates many functions of the apparatus which they presently own would prove to be an inefficient method of obtaining sound photography capabilities. Further, in the event that the user wishes to have the sound program transferred to magnetically stripped film, there is no provision in the system described for positively identifying sound and picture scenes to prevent inadvertent transfer of sound from one scene to the picture of another scene.

SUMMARY OF THE INVENTION

In accordance with the above, it is an object of the present invention to provide improved synchronization between picture and sound records during the taking of sound motion pictures.

Another object of the present invention is to make feasible the use of an ordinary home type magnetic tape recorder in the production of home sound picture films.

Still another object of the present invention is to provide apparatus for producing a sound recording for a motion picture film in which adjacent picture scenes on the recording are distinguishable and identifiable during playback.

Yet another object is to provide apparatus for marking the start and end of a sound scene on motion picture film with distinguishable codes to facilitate synchronized reproduction with a sound record.

In accordance with the above objects, a preferred embodiment of the present invention includes an accessory device for use with a camera having a sync pulse generator and a lamp for placing coding marks on the film and with a tape recorder of the type commonly found in the home. Circuitry in the accessory device includes a filter for rejecting a narrow band from the audio spectrum of the program being picked up by a microphone. An oscillator is provided to produce a carrier signal having a frequency variable within the rejected band of the program audio. Coding logic, responsive to the first pulse received from the camera during each scene, changes the frequency of the carrier signal so that adjacent audio scenes can be identified. The signals emitted by the oscillator are related to the rate at which sync pulses are received from the camera so as to code the audio tape with camera speed information. Further, the amplitude of the oscillator output is modulated to provide "clap-stick" effects at the start and end of a sound scene to assist in synchronization during playback or transfer of the sound record to a sound track on the film. The output of the oscillator is mixed with the output of the narrow band reject filter to be recorded on a single track of a tape recorder. During sound transfer or playback, the signals can be separated for audio and synchronization purposes. The film in the camera is also coded at the start and end of a scene by coding logic in the accessory box which, upon receipt of the first and last synchronization pulse from the camera, actuates a lamp in the camera to fog the edge of the film at the appropriate location.

BRIEF DESCRIPTION OF THE DRAWING

In the detailed description of the preferred embodiment of the invention presented below, reference is made to the accompanying drawing, in which:

FIG. 1 is a schematic showing of a preferred embodiment of the present invention;

FIG. 2 shows several film sections upon which have been recorded "start" and/or "end of scene" marks;

FIG. 3 schematically shows an arrangement in a camera for producing sync pulse signals;

FIG. 4 shows the frequency of the output of the coding oscillator which forms part of the present invention; and FIG. 5 shows amplitude of the output of the coding oscillator which forms part of the present invention.

DESCRIPTION OF THE PREFERRED EMBODIMENT

Referring to the drawing, FIG. 1 shows a recording system for home sound movies in accordance with an illustrated embodiment of the invention. A tape recorder 10 may be, and is here assumed to be, a conventional magnetic tape recorder of the type commonly found in private use. When used with the apparatus of the present invention, modification of the recorder is not necessary. Practically the only electrical requirement for the recorder is that it have a low level microphone input suitable for a dynamic (moving coil) microphone, a requirement that is met by almost all solid-state portable recorders now available.

A camera 12 is preferably of the home movie type with some modifications as described hereinafter. These modifications are effected to the end that synchronization signals may be applied to film in camera 12 and to sound tape in recorder 10. An accessory device or box 14, as schematically indicated by the broken enclosure lines of FIG. 1, contains various control items including a narrow band reject filter 18, a mixer 20, a level control 22, an amplifier 24, a coding oscillator 26 and start-stop cycle coding logic 28; these various items have also been shown schematically and will be described subsequently. It will be understood that while the accessory box is shown as a separate item in the preferred embodiment, its components may be incorporated in either the camera or recorder housings.

In preparation for taking a sound movie, camera 12 and recorder 10 are connected to accessory box 14 by suitable electrical cables. The camera battery pack (not shown) is electrically connected to the various circuit elements of accessory box 14 by a power line 16.

Next, recorder 10 is started in the record mode by the user and the record level is adjusted as for normal tape recording. Now camera 12 may be started and used to record as many sound scenes as desired. As will be apparent from the detailed description to follow, recorder 10 should not be turned off before the end of a camera scene, but it may be stopped between scenes.

Since the scene and sound are being recorded separately, it is desirable to in some manner identify corresponding positions on the film and tape. In accordance with the present invention, this is effected by light fogging selected sections of the film and by placing "clap-stick" pulses and scene identification and frame rate code signals on the sound tape.

A microphone 30 is connected to accessory box 14 and the signal resulting from sound pickup by the microphone is first filtered by a band-elimination filter 18 of a type well known in the art. Filter 18 extracts a small frequency band of the audio spectrum; this band may then be utilized to receive coding signals without interference from the program audio associated with the scene to be photographed.

After the program audio signal from microphone 30 has been fed into narrow band reject filter 18 to make a small portion of the audio spectrum available for a coding signal without interference from the scene sound, as subsequently described, the output of filter 18 is fed to mixer 20 in which a carrier signal is added. The carrier is essentially a sine wave in the frequency of the "rejected" band which has been modulated with the coding information as described hereinafter. During a scene take, the level of the carrier signal is maintained low compared to the audio signal from filter 18 by a level control 22. This is necessary to allow normal adjustment of the level control of recorder 10 and to avoid intermodulation distortion.

Preferably all coding functions initiate at camera 12 which is equipped with a mechanism for generating electrical sync pulses when its motor (not shown) is running. Such mechanisms are generally well known in the art, and examples are shown in U.S. Pat. Nos. 2,679,187 and 3,266,862, supra. In the illustrated embodiment of the present invention, sync pulses are produced by the camera under the control of the film pulldown cycle. Referring for the moment to FIG. 3, the pulldown mechanism of camera 12 is represented by a claw 34 which, in its film moving cycle, closes a switch 36; switch 36 when closed completes a control circuit to coding logic circuit 28. Camera 12 also is provided with a lamp 32 adjacent the film gate (not shown) for light fogging the edge of the film when ignited.

The sync pulses which originate in camera 12 are processed in two ways. The pulses are fed to stop-start cycle coding logic circuit 28 whose output is used to control ignition of lamp 32 and also to modulate the amplitude of the carrier recorded on the sound tape by means of level control circuit 22. The camera generated sync pulses are also used to control frequency modulation of the coding oscillator 26 with camera speed and scene identification information.

Upon detecting the first pulse of a series of pulses, coding logic circuit 28 closes an electrically conductive path to lamp 32 in camera 12 for momentarily flashing the lamp. As lamp 32 is flashed, a "start" mark is recorded on film section 38 (FIG. 2). The position of the mark relative to a perforation is predetermined by the position of a mask 40 (FIG. 3); "start" marks being made only near the trailing edge of perforations.

During the scene take, pulses of the same series immediately succeeding the first pulse and occurring at the regular pulldown rate are detected by coding logic circuit 28 but are not made effective to close the film coding path. For this purpose, the coding logic may include a time delay of a type well known in the art, for example a slow-operate relay or the combination of an RC network and a polar relay, the time delay means being held inoperative so long as the pulses of a series continue at their normal rate. During this period, mask 40 is moved (for instance by film motion) so that a subsequent "end of scene" mark will be made at the leading edge of a perforation.

Now when the scene is completed and film motion is stopped, the pulses from camera 12 terminate and coding logic circuit 28 will detect the absence of a closure of switch 36 for a predetermined interval, for example, 1/18 second, and will close a path for flashing lamp 32 for an "end of scene" mark on film section 38 (FIG. 2). Due to movement of the masking element during the scene recording, the "end of scene" mark is made near the leading edge of the nearest perforation. "Start" and "end of scene" marks are made on the film in the same manner each time the camera is started and stopped, respectively. "Start" and "end of scene" marks for a second scene have been shown in FIG. 2.

Besides coding the film with "start" and "end of scene" marks, the present invention contemplates coding the tape with "start-stop," "frame rate" and "scene identification" information. For this purpose, a coding oscillator 26 is provided in the specific illustrative embodiment. Oscillator 26 is a phase-shift oscillator designed to be frequency modulated over small deviations by, for example, the switching of a capacitor included in the oscillator circuit. The oscillator produces a low distortion sine wave in the rejection band of wave filter 18. This sine wave is frequency modulated by the pulldown cycle to provide percent deviations for the different scene identifications, for example approximately 2 percent for the first scene; 4 percent for the second scene; 6 percent for the third scene; etc (FIG. 4). The deviation for each scene may be changed by a suitable switch and ratchet mechanism or by a counter included in accessory box 14. Assuming that an overall deviation of 10 percent is permissible and that 2 percent is detectable in each instance (flutter assumed to be less than 1 percent), then a sequence of five scenes can be coded and any four sequential scenes could be missing because the recorder is not turned on, without losing synchronization. The frequency pulses within each scene shown in FIG. 4 are caused in response to the receipt of sync pulse signals from switch 36 of camera 12; one frequency pulse per film frame. In this manner the frame rate can be encoded onto the audio tape.

As discussed above, the amplitude of the oscillator output (represented by the curves of FIG. 5) is so controlled by level control 22 as to be well below that of the audio signal from filter 18 when the two are combined by mixer 20 for supply to recorder 10. However, during "start" and "end of scene" light flashes, the amplitude is increased well above the saturation level of the recorder, thereby producing an easily recognizable sound signal to be recorded at the start and end of the sound scene for timing information. This is similar to the "clap-stick" effect commonly utilized in commercial sound film recording. The saturation pulses, of course, block the audio during the respective short intervals and must be deleted during playback or preparation of the final sound film.

In the description to follow, it has been assumed that the scene sound now recorded on tape is to be transferred to a magnetic sound stripe on the film after the film is developed. However, it will be apparent to those skilled in the art that the sync code on the tape could be used by suitable apparatus to drive a projector in synchronization with the tape during playback.

For transfer, it is contemplated that the user will take or send the exposed film cartridge and recorded sound tape to a processor where the film will be processed in the usual manner. Using the tape coding to determine the number of scenes and their lengths and the scene identification code to determine scene sequence, the processor will transfer the audio program recorded on the tape to a magnetic stripe on the film by any of several known methods. The scene identification code may be used to match film and tape scenes from the start of the film, thereby determining which, if any, sound scenes should be skipped in the transfer. Silent scenes, that is those without "start-stop" coding, on the film would be automatically skipped. Scene length information may be used to match the timing of sound and picture by adjusting the speed of the tape or film transport during transfer. The frame rate coding could also be used for synchronization or as a check on scene identification by examination for compatibility of scene length and frame rate.

The invention has been described in detail with particular reference to a preferred embodiment thereof, but it will be understood that variations and modifications can be effected within the spirit and scope of the invention.

I claim:

1. Apparatus for use with a motion picture camera and a recorder for producing a sound record of the accompanying sound for pictures taken by the camera, said apparatus comprising:

means for producing a signal having a frequency which is variable within a predetermined range to provide scene identification coding signals for the sound record;

means responsive to camera operation to take a sound scene for causing said signal producing means to modulate said signal to a particular frequency within said range different from the frequencies produced for adjacent sound scenes on the film; and means for transmitting said modulated signal to the recorder.

2. Apparatus for use with a motion picture camera, a recorder for producing a sound record of the accompanying sound for pictures taken by the camera, and a microphone for picking up sound to be recorded, said apparatus comprising:

filtering means for rejecting a narrow band of frequencies from the sound spectrum of the output of the microphone;

means for producing a signal having a frequency which is variable within said narrow band to provide scene identification coding signals for the sound record;

means responsive to camera operation to take a sound scene for causing said signal producing means to modulate said signal to a particular frequency within said narrow band different from the frequencies produced by adjacent sound scenes on the film; and a circuit for combining the output from said filtering means and said signal producing means, whereby the combined signal may be recorded by the recorder on a single sound track.

3. Apparatus as defined in claim 2 further comprising means for modulating the amplitude of said variable frequency signal from a normal level substantially below the level of the output from said filtering means to a substantially increased level for short intervals at times corresponding to the start and end of each sound scene photographed by the camera.

4. Apparatus for synchronizing a motion picture camera and a recorder for producing a sound record of the accompanying sound for pictures taken by said camera, the camera being of the type having means for producing a series of synchronization signals when the camera is running, said apparatus comprising:

means producing a carrier signal having a frequency which is variable within a predetermined range to provide coding signals to the sound record;

means for detecting initiation of a series of the synchronization signals produced by the camera;

means responsive to said detection means for causing said carrier signal producing means to modulate said coding signal to a particular frequency within said range different from the frequencies produced by adjacent sound scenes on the film; and means for transmitting said modulated coding signal to the recorder.

5. Apparatus as defined in claim 4 wherein said synchronization signals are representative of film speed through the camera and wherein said carrier signal has a second characteristic variable to indicate film speed through said camera, and further comprising means responsive to said synchronization signals for modulating the second characteristic of said carrier signal.

6. Apparatus as defined in claim 4 further comprising:

a microphone for picking up the scene sound to be recorded;

filtering means for rejecting a narrow band of frequencies from the sound spectrum of the output of said microphone, said predetermined range through which said carrier signal is variable being within said narrow band; and a circuit for combining the output from said filtering means and said coding signal, whereby the combined signal may be recorded by the recorder on a single sound track.

7. Apparatus as defined in claim 6 further comprising means for applying a code mark to the film in the camera, said mark applying means being responsive to said detection means, whereby said mark applying means is actuated at the start and end of a sound scene.

8. Apparatus for placing scene identification marks on perforated film in a motion picture camera, said apparatus comprising:

means for placing a physical mark on the film in the camera;

means responsive to actuation and to deactuation of the camera for activating said marking means; and means causing said mark to be placed on the film in a predetermined location relative to a perforation when the camera is actuated and in a different predetermined location when the camera is deactuated.

9. Apparatus as defined in claim 8 wherein said marking means includes:

a light source for light fogging the film; and a mask movable relative to the film for causing the light fog to be applied to the film at different locations for the start and end of a sound scene, respectively.

* * * * *